(12) United States Patent
Winters et al.

(10) Patent No.: US 9,446,337 B2
(45) Date of Patent: Sep. 20, 2016

(54) FILTER MEDIA FOR LONG-TERM HIGH TEMPERATURE APPLICATIONS

(71) Applicant: Southern Felt Company, Inc., North Augusta, SC (US)

(72) Inventors: Eric Winters, North Augusta, SC (US); John Lewis, North Augusta, SC (US); Brian Fields, North Augusta, SC (US); Jin Choi, North Augusta, SC (US)

(73) Assignee: Southern Felt Company, Inc., North Augusta, SC (US)

( * ) Notice: Subject to any disclaimer, the term of this patent is extended or adjusted under 35 U.S.C. 154(b) by 843 days.

(21) Appl. No.: 13/627,471

(22) Filed: Sep. 26, 2012

(65) Prior Publication Data

US 2014/0083926 A1    Mar. 27, 2014

(51) Int. Cl.
*B01D 39/20* (2006.01)
*B01D 39/08* (2006.01)
*B01D 39/16* (2006.01)

(52) U.S. Cl.
CPC ............ *B01D 39/083* (2013.01); *B01D 39/08* (2013.01); *B01D 39/1623* (2013.01); *B01D 39/2017* (2013.01); *B01D 2239/065* (2013.01); *B01D 2239/0681* (2013.01); *B01D 2239/0686* (2013.01); *B01D 2239/1216* (2013.01)

(58) Field of Classification Search
CPC ...... B01D 39/02; B01D 39/04; B01D 39/06; B01D 39/08; B01D 39/083; B01D 39/086; B01D 39/16; B01D 39/1607; B01D 39/1615; B01D 39/1623; B01D 39/163; B01D 2239/0216; B01D 2239/0225; B01D 2239/06; B01D 2239/0618; B01D 2239/0622; B01D 2239/0627; B01D 2239/064; B01D 2239/065; B01D 2239/0659; B01D 2239/0663; B01D 2239/0668; B01D 2239/1216; B01D 2239/1219; B01D 2239/1233; B01D 2239/1258; B01D 29/0027; B01D 29/56; B01D 39/2017; B01D 39/202; B01D 39/2024; B01D 2239/0681; B01D 2239/0686; B01D 2239/12; B01D 2239/1275; B01D 2239/1283; B01D 2239/1291
USPC ........... 210/489, 491, 503, 505; 55/485–487, 55/527, 528
See application file for complete search history.

(56) References Cited

U.S. PATENT DOCUMENTS

| | | | |
|---|---|---|---|
| 4,161,422 A | 7/1979 | Lawson et al. | |
| 4,274,914 A | 6/1981 | Keith et al. | |
| 4,713,285 A | 12/1987 | Klein | |
| 4,765,812 A | 8/1988 | Homonoff et al. | |
| 5,068,141 A | 11/1991 | Kubo et al. | |
| 5,283,106 A | 2/1994 | Seiler et al. | |
| 5,820,645 A * | 10/1998 | Murphy, Jr. | 55/385.3 |
| 6,171,684 B1 * | 1/2001 | Kahlbaugh et al. | 428/212 |
| 6,695,148 B2 | 2/2004 | Homonoff et al. | |
| 7,153,793 B2 * | 12/2006 | Willis | B01D 39/1623 442/335 |
| 2001/0034399 A1 * | 10/2001 | Kohlhammer | D06M 15/233 524/501 |

(Continued)

*Primary Examiner* — Joseph Drodge
(74) *Attorney, Agent, or Firm* — Lisa J. Moyles; Janelle A. Bailey

(57) ABSTRACT

A filter media is generally described including an upstream layer of a nonwoven fiber having a denier between about 5.0 and 7.0 and a weight of between about 3.0 and 5.0 opsy, optionally a scrim, and a cap layer of a fiber having a denier between about 0.1 and 5.0, and a weight between about 2.0 and 4.0 opsy carried by the upstream layer and disposed downstream from the upstream layer. The upstream layer, scrim and cap layer can have a weight of about 4.0 opsy, 2.0 opsy and 3.0 opsy respectively. A downstream layer can be disposed between the upstream layer and the cap layer.

22 Claims, 4 Drawing Sheets

(56) References Cited

U.S. PATENT DOCUMENTS

| | | | |
|---|---|---|---|
| 2003/0084788 A1* | 5/2003 | Fraser, Jr. | B01D 39/1623 95/285 |
| 2006/0096263 A1* | 5/2006 | Kahlbaugh et al. | 55/527 |
| 2006/0242933 A1* | 11/2006 | Webb | B01D 39/1615 55/486 |
| 2008/0134652 A1* | 6/2008 | Lim et al. | 55/486 |
| 2009/0044702 A1* | 2/2009 | Adamek et al. | 95/287 |
| 2009/0255226 A1* | 10/2009 | Kohli | B01D 39/1623 55/379 |
| 2011/0198280 A1* | 8/2011 | Jones et al. | 210/489 |
| 2012/0234748 A1* | 9/2012 | Little | D04H 1/435 210/488 |
| 2014/0326661 A1* | 11/2014 | Madsen et al. | 210/505 |

* cited by examiner

FILTER MEDIA FOR LONG-TERM HIGH TEMPERATURE APPLICATIONS

FIELD OF THE INVENTION

This invention is directed to a manufacturing part for a filter used to remove particles from a stream. More specifically, the filter media is a high efficiency and durable filter media for removing particles from a hydraulic fluid stream.

BACKGROUND

During the development of many machines, the use of fluids is an integral part of the operation of the machine. For example, many machines rely upon a power source and a transmission system to provide controlled application of power. Transmissions can be a set of cooperating gears for speed and torque conversions from a power source (such as a rotating power source) to another device (such as a drive axle or propeller). In operation, the transmission uses transmission fluid to provide hydraulic power to move the gears from one location to another to perform the power redirection, and speed and torque conversions.

One of the operational realities with transmission fluid is that transmissions can create a high temperature environment. The internal friction can increase the operational temperature to over 250° F., significantly above the normal operating temperature of about 175° F. At temperatures higher than the normal operating temperature, the transmission fluid can oxidize which can destroy the lubricating properties and can result in contaminates entering the fluid stream. High operating temperatures cause seals to breakdown which can result in dirt and other contaminates entering the fluid. Further, the normal operation can cause contaminates to become present in the fluid.

Transmission filters are used to help remove these contaminants from the transmission fluid itself. The filter can hold metal particles, debris and other foreign material to prevent the material from continued circulation in the fluid stream. Characteristics of filter media include the ability to remove a certain percentage of particulate of a certain size, durability, porosity, high temperature operations and the like. It can be desirable to have various layers of filter material which operate to provide certain physical characteristic. Further, multiple layers can provide for mechanical stability of the filter medium itself.

There are several types of filter media that have been previously attempted for use with hydraulic fluid filtration, and include air-laid and wet-laid processing which can provide filtration for both air and fluid streams. However, most of these materials, especially non-woven material, can suffer from a lack of mechanical strength and shortened operational life when in contact with a fluid, including transmission fluids. Further, pressures from the fluid stream can exceed the burst threshold of these materials rendering the medium useless in such environments if the filter material has a structural failure (e.g. bursts).

There have been several attempts to produce a non-woven filter media with sufficient physical properties to be used in filter media. For example, U.S. Pat. No. 6,695,148 is directed to a transmission fluid filter felt. However, these attempts fail to provide a filter media with sufficient particulate removal, strength and filtration life using a layered arrangement of materials with different densities to provide the desired filtering characteristics. Additional attempts to provide for a high strength, high capacity filter media include U.S. Pat. Nos. 4,161,422; 4,274,914; 4,713,285; 4,765,812; 5,068,141 and 5,283,106.

It would be advantageous for the manufacturing of hydraulic filters to have a filter media that was a high strength, high capacity filter without the limitations existing in the prior art such as lack of burst strength when used in wet, high pressure fluid streams and air streams.

Therefore, it is an object of the current invention to provide a high strength filter medium that can be used in the filtration of fluids capable of operating in a high pressure, high temperature environment.

It is another object of the present invention to provide for a layered filter material for use in a filter medium having different fiber types carried by a scrim to provide mechanical support for the filter material.

SUMMARY OF THE INVENTION

The above objectives are accomplished by providing a filter medium for use in manufacturing of hydraulic fluid filters comprising: an upstream layer of non-woven fiber wherein the fibers of the upstream layer having a thickness greater than about 50% of the overall thickness of the filter media, a weight in the range of 20% to 60% of the total weight of the filter media and an average fiber diameter between about 10 to 40 microns; a scrim disposed adjacent to the upstream layer, arranged downstream from the upstream layer, the scrim being between about 10% to 40% of the total weight of the filter medium; and a cap layer of non-woven fiber carried by the scrim disposed downstream of the upstream layers having a denier between about 0.1 to 5, about 10% to 30% of the total weight of the filter medium and a fiber diameter between about 1 to 21 microns.

The filter medium can also include a downstream layer disposed between the scrim and the cap layer having about 10% to 50% of the total weight of the filter medium and an average fiber diameter between about 10 to 40 microns and between about 1 to 15 denier. The upstream layer, downstream layer, scrim and cap layer can include material selected from the group consisting of: polyethylene, polypropylene, nylon, polyester, acrylic, PPS, meta-aramid, para-aramid, PTFE, glass and any combination thereof.

The scrim should be selected from the group consisting of: a woven scrim, a leno scrim, mock leno scrim, locking leno scrim, a knit scrim, made from filament or spun yarn and any combination thereof.

DESCRIPTION OF THE DRAWINGS

The following description of the invention will be better understood by reference to the following drawings that are incorporated and made part of the written specification.

DESCRIPTION OF THE INVENTION

Figure 1:
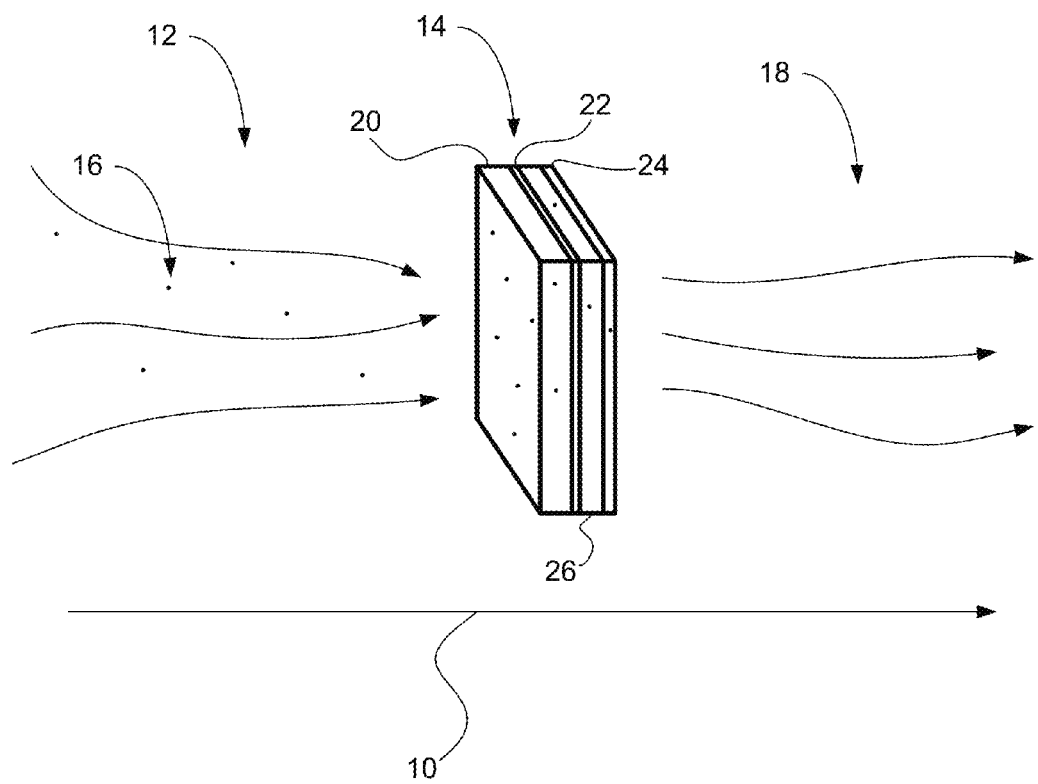
FIG. 1 is a perspective view of aspects of the invention.

Referring to FIG. 1, the invention will be discussed in more detail. A fluid stream, i.e. hydraulic fluid such as transmission fluid, is flowing in a direction shown as 10. The portion of the stream 12 that is upstream to the filter medium 14 can include contaminates 16. The filter medium can trap these contaminates thereby removing them from the portion of the stream 18 that is downstream the filter medium thereby removing these contaminates from recirculating. The stream can be aqueous or non-aqueous. The stream can be hydraulic fluid such as transmission fluid, oil and the like. In one embodiment, the filter medium is suited for filtering transmission fluid such as used with the power train of a vehicle.

Further, the filter medium can be arranged in layers which include an upstream layer 20, a scrim 22 and a cap layer 24. In one embodiment, a downstream layer 26 can be included and disposed between the scrim and the cap layer.

Figure 2:
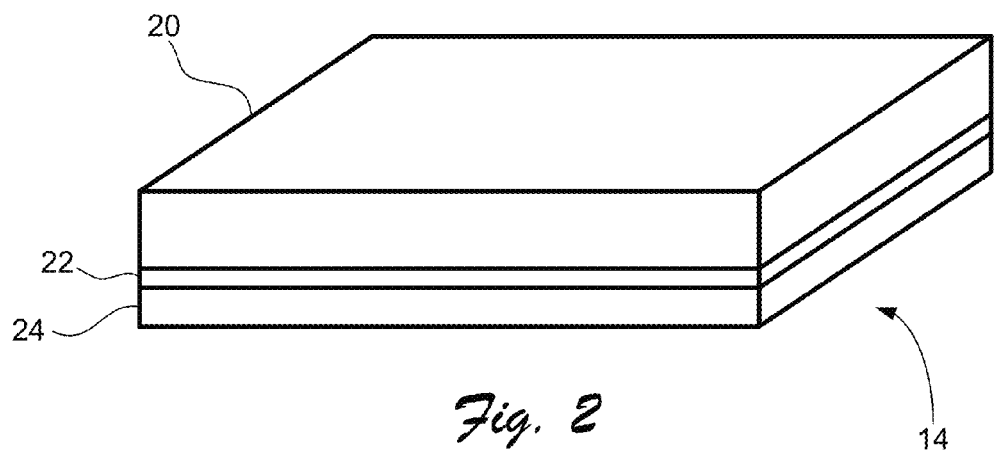
FIG. 2 is a perspective view of aspects of the invention.
Figure 3:
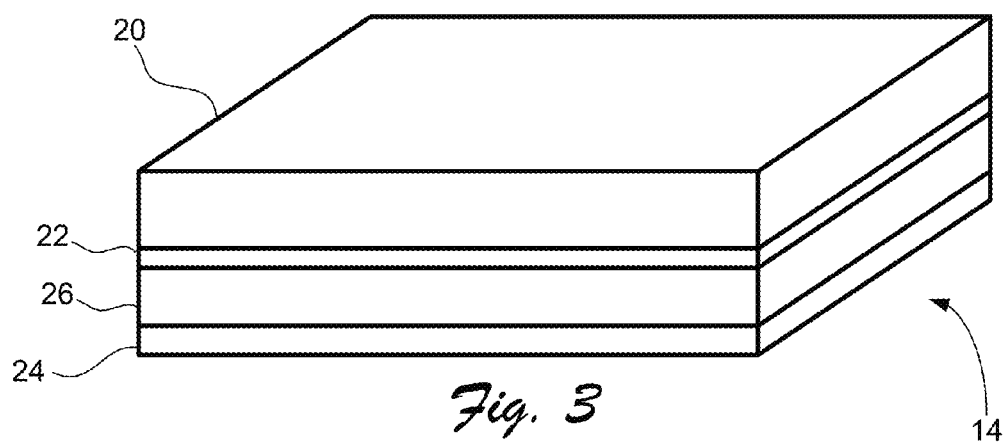
FIG. 3 is a perspective view of aspects of the invention.

The various layers can be seen in FIGS. 2 and 3. The upstream layer can be a non-woven fiber with a denier of between about 1 and 15 and have an open porous arrangement. In one embodiment, the upstream layer has a thickness between about 50% to 70% of the overall thickness of the filter material 14. For example, if the thickness of the filter material 14 is 10 mm, the thickness of the upstream layer would be between about 5 mm and 7 mm. In one embodiment, the denier of the upstream layer is between about 1 to 15. In one embodiment, the upstream layer is between about 20% and 60% of the overall weight of the filter medium. In one embodiment, the upstream layer is between about 10 to 40 microns. The upstream layer can be made from material including polyethylene, polypropylene, nylon, polyester, acrylic, PPS, meta-aramid, para-aramid, PTFE, glass and any combination thereof.

The cap layer can be made from a non-woven fiber and disposed adjacent to the scrim. In one embodiment, the scrim supports the upstream layer. In one embodiment, the cap layer has an average fiber diameter of between about 1 to 21 microns. In one embodiment, the cap layer has a fiber of between about 0.1 and 5.0 denier. In one embodiment, the cap layer is between about 10% and 30% of the total weight of the filter medium. In one embodiment, the cap layer is between about 5% and 25% of the overall thickness of the filter medium.

The cap layer can also be made from a light weight nonwoven material and need not necessarily be made from a needle felt. The cap layer can be made from or include any of the following: hydroentangled nonwoven using staple splittable fiber such as a 60 gsm nonwoven with 2.25 denier 16 pie PET/PA fiber; spunbond hydroentangled nonwoven using splittable continuous filaments such as distributed under the trademark Evolon; thermal bonded nonwoven such as provided by the company Bondex, Inc.; spunbond nonwoven; melt blown nonwoven; a combination of layers comprising a combination of spunbond (S) and melt blown (M) fabrics such as a SMS or SM combinations; wetlaid; wetlaid containing glass fibers; and laminate combinations of any of the proceeding materials. The cap layer can be attached to the upstream layer through methods taken from the group comprising: needling, heat lamination, chemical lamination such as spaced adhesives, resins, epoxy and any combination of these.

Evolon is a fabric, which is manufactured by Freudenberg and includes a microfilament fabric with a dense compact fiber structure. It has good textile and mechanical properties, and is soft, drapable and lightweight with good strength. It has good barrier and filtration properties, and is very absorbent, with quick dry properties, and is breathable.

Figure 4:
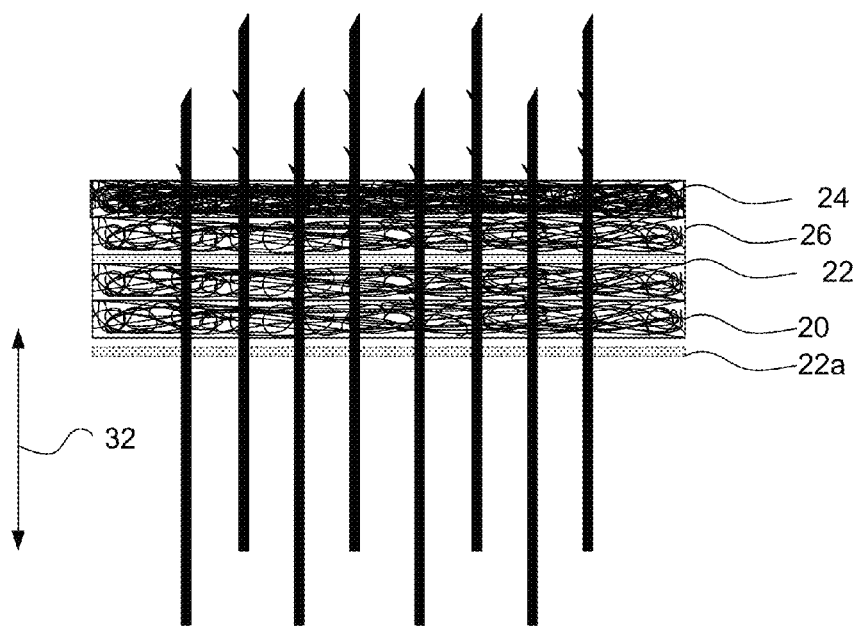
FIG. 4 is a side view of aspects of the invention.

In one embodiment, the scrim is disposed adjacent to said cap layer and upstream from said cap layer. The scrim can be 10% to 40% of the total weight of the filter medium. The scrim can be between about 2% and 10% of the total thickness of the filter medium. The scrim can be a woven scrim, a leno scrim, a mock leno scrim, a locking leno scrim, a knit scrim, made from filaments or spun yarn and any combination thereof. The scrim can be a nonwoven material and can include: polyethylene, polypropylene, nylon, polyester, acrylic, PPS, meta-aramid, para-aramid, PTFE, glass and any combination thereof. In the manufacture of the filter medium, referring to FIG. 4, an upstream layer 20 can be placed in a needle punch machine or carding machine with a scrim 22a placed along the outside of upstream layer 20. When the needles 30 move in the direction 32, the scrim can be forced into the upstream layer and shown as 22 disposed within the upstream layer. The scrim begins to dispose at a location shown as 22a and is forced into the interior of the upstream layer shown as 22. This defines a downstream layer 26 adjacent to cap layer 24. Further, the needle punching process causes the cap layer, downstream layer, scrim and upstream layer to form a laminated filter medium.

The downstream layer can be a nonwoven material and can include: polyethylene, polypropylene, nylon, polyester, acrylic, PPS, meta-aramid, para-aramid, PTFE, glass and any combination thereof. In one embodiment, the downstream layer is between about 10% and 30% of the total weight of the filter medium. The downstream layer can have an average fiber diameter of between about 10 to 40 microns. The downstream layer can have fiber of between about 1 and 15 denier. The downstream layer can be between about 10% and 40% of the overall thickness of the filter medium.

In one embodiment, the upstream layer and the downstream layer combined have about 50% to 80% of the thickness of the overall thickness of the filter medium.

The following Table 1 illustrates some of the properties of an embodiment and its various aspects:

TABLE 1

| Layer | Thickness vs. Overall Thickness | Denier | Weight vs. Overall Weight | Fiber Diameter (microns) |
|---|---|---|---|---|
| Upstream | 50% to 70% | 1 to 15 | 20% to 60% | 10 to 40 |
| Cap | 5% to 25% | 0.1 to 5 | 10% to 30% | 1 to 21 |
| Scrim | 10% to 40% | | 10% to 40% | |
| Downstream | 20% to 40% | 1 to 15 | 10% to 50% | 10 to 40 |
| Upstream +– Downstream | 50% to 70% | | 20% to 60% | |

The filter medium of the present invention can have a particle removal rate as shown in the following Table 2:

TABLE 2

| | Efficiency Percentage (%) | |
|---|---|---|
| Particle Size (μm) | @ 132 cfm | @ 149 cfm |
| 30.0 | 58.76 | 54.64 |
| 40.0 | 83.04 | 79.65 |
| 50.0 | 92.96 | 91.08 |
| 60.0 | 97.44 | 96.03 |
| 70.0 | 98.51 | 97.33 |
| 80.0 | 99.21 | 98.92 |
| 90.0 | 99.23 | 99.22 |
| 100.0 | 99.35 | 100.00 |

In obtaining the results shown in Table 2, the filter media in a six inch disk exhibited a retention capacity of 5.27 grams at 132 cfm and 5.48 grams at 162 cfm. The life of the filter media was 25.10 minutes for 132 cfm and 26.12 minutes for 162 cfm.

In another test for flow vs. pressure drop, a six inch disk in a pump filled with automatic transmission fluid (Dexron®

VI ATF) was used. Dexron® VI is an automatic transmission fluid (ATF) that is distributed by the Exxon Mobile Corporation, and is a high performance, synthetic blend ATF made from severely hydrotreated and hydrocracked base oil such as petroleum. The base oil may be a mixture of the following CAS#s., as assigned by the Chemical Abstracts Service (CAS): 8042-47-5, 64742-46-7, 64742-52-5, 64742-54-7, 72623-84-8, 72623-85-9, 72623-86-0, 72623-87-1, 178603-64-0, 178603-65-1, 178603-66-2 and 445411-73-4.

In the aforementioned test, the fluid was pulled through the filter media by a downstream pump and the pressure drop was measured over a range of flow rates with the results shown in Table 3. This test is designed to measure the media's ability to flow oil at a cool and ambient temperature. This test method is referred to as the Filtertek TM536 (24° C.).

TABLE 3

| Flow Rate (lpm) | Pressure Drop ("Hg) @ 24° C. | |
| --- | --- | --- |
| | @ 141 cfm | @ 162 cfm |
| 3.5 | 1.20 | 1.15 |
| 6.9 | 1.85 | 1.65 |
| 10.3 | 2.55 | 2.35 |
| 13.7 | 3.40 | 2.90 |
| 17.1 | 4.20 | 3.66 |
| 20.4 | 5.00 | 4.20 |
| 23.8 | 5.80 | 4.90 |
| 27.2 | 6.60 | 5.75 |
| 30.6 | 7.70 | 6.50 |
| 34.0 | 8.65 | 7.20 |
| 37.4 | 9.50 | 7.90 |
| 40.7 | 10.40 | 8.70 |

Figure 5:
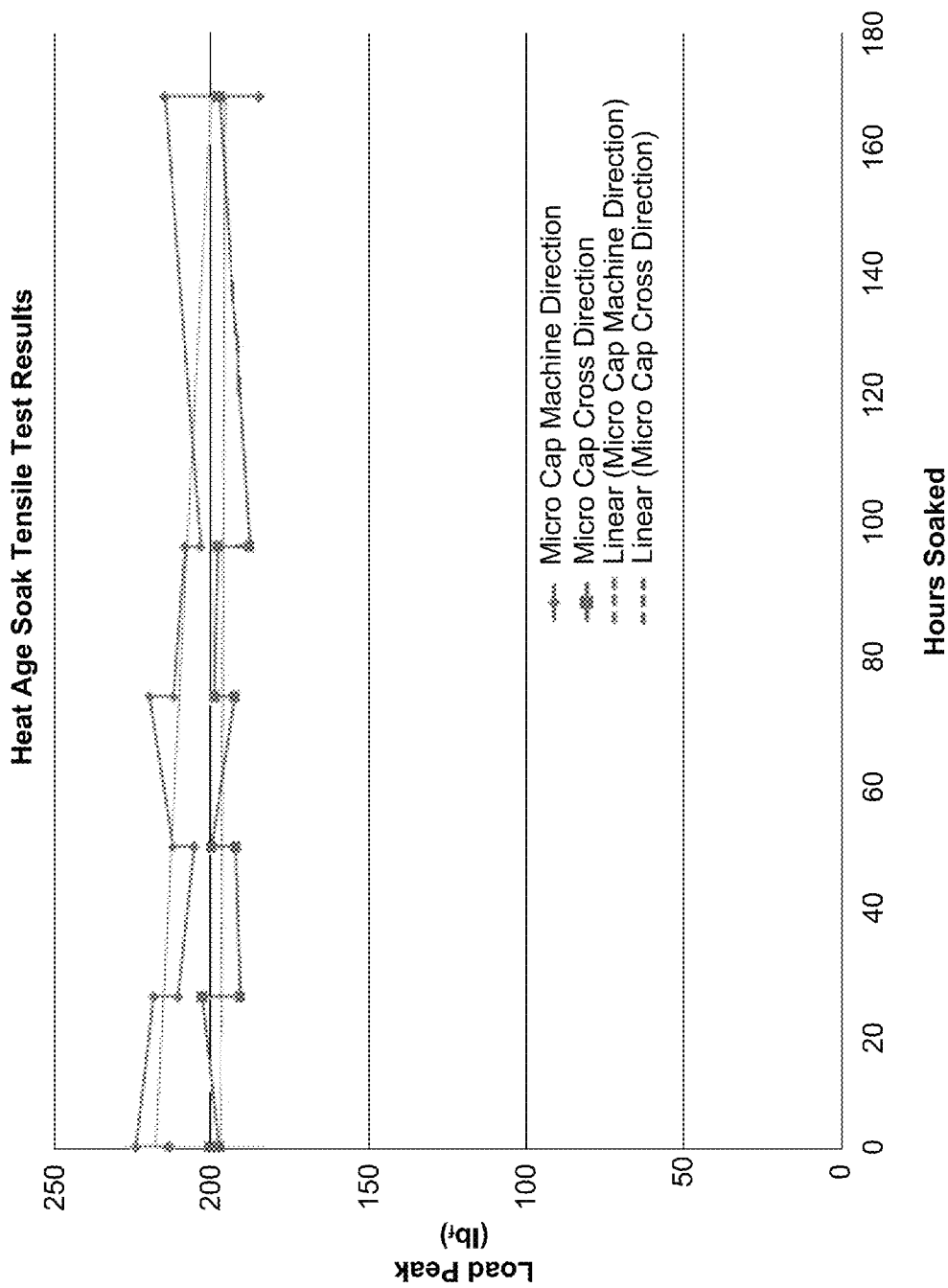
FIG. 5 is test results displayed in graphical format related to the present invention.

The invention has also been tested for chemical compatibility. This test measures the effects of prolonged exposure to hot ATF. Using a 2 inch by 6 inch filter media section, the media is exposed to ATF at 302° F. for 24 to 168 hours. Every 24 hours, 4 strips are removed and are pulled starting with pneumatic grips 2 inches apart. The pull rate is 1.00 inch per minute. This test is referred to as the TM 659 test. In one embodiment, an Instrom 4201 gauge is used to obtain measurements. The results are shown in graphical form in FIG. 5.

In one embodiment, the upstream layer is a 3.5 to 4.5 ounce per square yard (conventionally referred to as "opsy" or "osy") layer made from about 6denier fibers. In one embodiment, the upstream layer is 100% 6 denier fiber. The scrim is a 1 to 3 opsy filament polyester scrim. The cap layer can be a 2 to 4 opsy blend including about 75% of about 1.5 denier fiber and about 25% of 2.25 denier fiber. In one embodiment, the upstream layer is 4 opsy, the scrim is 2 opsy and the cap is 3 opsy. In the event that the layers are treated with a liquid bath, the bath can add 0.5 to 1.5 ounces of chemicals to the layers. In one embodiment, the chemicals are 0.9% by weight. The upstream layer can include fiber having between about 1denier to about 15denier and the cap layer can include fiber having between about 1.0 denier to about 5.0denier. This embodiment provides air permeability of about 150 cfm. Once the upstream layer and cap have been manufactured into a single layered material, the material is treated with a chemical bath that can include: a phenol formaldehyde resin, a polymer having high molecular weight, acrylic acid chains in a liquid state, ammonia and water. The acrylic acid chains can be cross-linked. In one embodiment, the chemical bath comprises 7% to 30% by weight of a phenol formaldehyde resin, 2% to 9% polymer, 0% to 1% ammonia and 40% to 91% water. In one embodiment, the polymer is available under the trademark Carbopol®, offered by Lubrizol. In one embodiment, the phenol formaldehyde is offered under the brand designation 510 D 50, offered by Georgia-Pacific.

It is understood that the above descriptions and illustrations are intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A filter media configured for long term high temperature applications, comprising:
    an upstream layer comprised of nonwoven fiber having a denier between about 5.0 and 7.0, and a weight of between about 3 and 5 opsy; and
    a cap layer comprising a first fiber having a denier between about 1.0 and 2.0 and a second fiber having a denier between about 1.75 and 2.75, wherein the cap layer has a weight between about 2.0 and 4.0 opsy, carried by said upstream layer and disposed downstream from said upstream layer,
    wherein the filter media exhibits a substantially stable tensile strength at a temperature of at least about 300° F. for at least about 24 hours, and wherein pressure drop across the filter media is less than about 10.4 inches Hg for a flow rate of oil or transmission fluid up to about 40.7 lpm at a temperature of about 24° C.

2. The filter media of claim 1, wherein said cap layer is made with materials taken from the group consisting of: hydroentangled nonwoven using staple splittable fiber; spunbond hydroentangled nonwoven; thermal bonded nonwoven; spunbond nonwoven; melt blown nonwoven; a combination of layers comprising a combination of spunbond (S) and melt blown (M) fabrics; SMS combinations; SM combinations; wetlaid fibers; glass fibers; and any combinations thereof.

3. The filter media of claim 1, wherein said cap layer is attached to said upstream layer by method and materials taken from the group comprising needling, heat lamination, chemical lamination, resins, epoxy, and any combinations thereof.

4. The filter media of claim 1, wherein a filament polyester scrim is disposed between said upstream layer and said cap layer, and said cap layer has a weight between about 1.0 and 3.0 opsy.

5. The filter media of claim 1, wherein said filter media has one or more of the following physical characteristics: (a) a particle holding capacity about 5.0 grams per 6 inch disk at 130 cfm, (b) a particle holding capacity about 5.5 grams per 6 inch disk at about 160 cfm; (c) a life span of about 25 minutes at about 130 cfm, (d) a life span of about 26 minutes at about 160 cfm, (e) a pressure drop of less than about 6 at about 24 lpm according to Filtertek TM 536 test method, (f) a tensile test result of about 20 lbf after about 20 hours of soaking according to test method TM 659 and (g) air permeability of about 150 cfm.

6. The filter media of claim 1, further comprising a scrim having a thickness of about 2% to about 10% of the total thickness of the filter media.

7. The filter media of claim 1, wherein said second fiber has a different denier than said first fiber.

8. A filter media configured for long term high temperature applications, comprising:
an upstream layer of nonwoven fiber, wherein said upstream layer has a thickness greater than about 50% of the overall thickness of said filter media, a weight in the range of 20% to 60% of the total weight of said filter media and an average fiber diameter between about 10 to 40 microns;
a scrim disposed adjacent to said upstream layer, arranged downstream from said upstream layer, said scrim being between about 10% to 40% of the total weight of said filter media; and
a cap layer of nonwoven fiber carried by said scrim disposed downstream of said upstream layer having a denier between about 0.1 to 5.0, a weight of about 10% to 30% of the total weight of said filter media and a fiber diameter between about 1 to 21 microns,
wherein the filter media exhibits a substantially stable tensile strength at a temperature of at least about 300° F. for at least about 24 hours, and wherein pressure drop across the filter media is less than about 10.4 inches Hg for a flow rate of oil or transmission fluid up to about 40.7 lpm at a temperature of about 24° C.

9. The filter media of claim 8, wherein:
said cap layer is made with materials taken from the group consisting of: hydroentangled nonwoven using staple splittable fiber; spunbond hydroentangled nonwoven; thermal bonded nonwoven; spunbond nonwoven; melt blown nonwoven; a combination of layers comprising a combination of spunbond (S) and melt blown (M) fabrics; SMS combinations; SM combinations; wetlaid fibers; glass fibers; and any combinations thereof.

10. The filter media of claim 8, wherein:
said upstream layer comprises a 3.0 denier fiber; and
said cap layer comprises about 75% of a fiber having a denier between about 1.0 and 2.0 and about 25% of a fiber having between about 1.75 and 2.75 denier.

11. The filter media of claim 8, including a downstream layer disposed between said scrim and said cap layer, wherein the downstream layer has about 10% to 50% of the total weight of said filter media, and has an average fiber diameter between about 10 to 40 microns and between about 1 to 15 denier.

12. The filter media of claim 8, wherein said scrim is selected from the group consisting of: a woven scrim, a leno scrim, a mock leno scrim, a locking leno scrim, a knit scrim, made from filament or spun yarn and any combinations thereof.

13. The filter media of claim 8, wherein:
said upstream layer includes fiber having a weight of about 4.0 opsy;
said scrim includes fiber having a weight of about 2.0 opsy; and,
said cap layer includes fiber having a weight of about 3.0 opsy.

14. The filter media of claim 8, wherein said upstream layer is between about 1 to 15 denier.

15. The filter media of claim 8, wherein said upstream layer has a thickness between about 50% to 70% of the overall thickness of said filter media.

16. The filter media of claim 8, wherein the denier of said upstream layer and the denier of said cap layer are in the ratio of about 2:1 or greater.

17. A filter media configured for long term high temperature applications, comprising:
an upstream layer of nonwoven fiber, wherein said upstream layer has at least one of the following characteristics: (a) a thickness greater than about 50% of the overall thickness of said filter media, (b) a weight in the range of 20% to 60% of the total weight of said filter media, and (c) an average fiber diameter between about 10 to 40 microns; and
a cap layer of nonwoven fiber carried by a scrim and disposed downstream of said upstream layer, wherein the cap layer has at least one of the following characteristics: a denier between about 0.1 to 5.0, a weight of about 10% to 30% of the total weight of said filter media and a fiber diameter between about 1 to 21 microns,
wherein the filter media exhibits a substantially stable tensile strength at a temperature of at least about 300° F. for at least about 24 hours, and wherein pressure drop across the filter media is less than about 10.4 inches Hg for a flow rate of oil or transmission fluid up to about 40.7 lpm at a temperature of about 24° C.

18. The filter media of claim 17, wherein the scrim is disposed adjacent to said upstream layer, is arranged downstream from said upstream layer, and is between about 10% to 40% of the total weight of said filter media.

19. The filter media of claim 17, further comprising a downstream layer disposed between said scrim and said cap layer, wherein the downstream layer has at least one of the following physical characteristics: (a) about 10% to 50% of the total weight of said filter media, (b) an average fiber diameter between about 10 to 40 microns, and (c) between about 1 to 15 denier.

20. The filter media of claim 17, including a downstream layer disposed between said upstream layer and said cap layer.

21. The filter media of claim 17, wherein said filter media has a pressure drop less than 5" Hg at 24° C. for flow rates less than 20 lpm as measured by the Filtertek TM536 method.

22. The filter media of claim 17, including phenol formaldehyde resin.

* * * * *